(12) United States Patent
Suzuki et al.

(10) Patent No.: US 12,508,098 B2
(45) Date of Patent: Dec. 30, 2025

(54) MEDICAL DEVICE MANAGEMENT SYSTEM, MEDICAL DEVICE, RELAY DEVICE, MEDICAL DEVICE MANAGEMENT METHOD AND RECORDING MEDIUM

(71) Applicant: OLYMPUS MEDICAL SYSTEMS CORP., Tokyo (JP)

(72) Inventors: Takeo Suzuki, Hachioji (JP); Yasunori Matsui, Hachioji (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 329 days.

(21) Appl. No.: 18/371,710

(22) Filed: Sep. 22, 2023

(65) Prior Publication Data
US 2024/0008950 A1  Jan. 11, 2024

Related U.S. Application Data

(63) Continuation of application No. PCT/JP2021/025368, filed on Jul. 5, 2021.

(51) Int. Cl.
*A61B 90/00* (2016.01)

(52) U.S. Cl.
CPC ...... *A61B 90/08* (2016.02); *A61B 2090/0803* (2016.02); *A61B 2090/0807* (2016.02); *A61B 2090/0814* (2016.02)

(58) Field of Classification Search
CPC ............ A61B 90/08; A61B 2090/0803; A61B 2090/0807; A61B 2090/0814; G16H 40/40
See application file for complete search history.

(56) References Cited

U.S. PATENT DOCUMENTS

| | | | |
|---|---|---|---|
| 6,237,604 B1 * | 5/2001 | Burnside | A61B 90/90 128/897 |
| 6,578,579 B2 | 6/2003 | Burnside et al. | |
| 6,651,669 B1 | 11/2003 | Burnside | |
| 2011/0184239 A1 * | 7/2011 | Wright | A61B 1/0684 600/118 |
| 2015/0238757 A1 | 8/2015 | Van Den Biggelaar et al. | |

FOREIGN PATENT DOCUMENTS

| | | |
|---|---|---|
| JP | 2000-060789 A | 2/2000 |
| JP | 2009-226170 A | 10/2009 |
| JP | 2010-214199 A | 9/2010 |
| WO | WO-2011079752 A1 * | 7/2011 ............. G05B 15/02 |

OTHER PUBLICATIONS

Stanek, Sean R. et al. "Automatic Real-Time Detection of Endoscopic Procedures Using Temporal Features." Comput Methods Programs Biomed. May 31, 2011; 108(2): 524-535 (Year: 2011).*
International Preliminary Report on Patentability dated Dec. 14, 2023 and Written Opinion of The International Searching Authority dated Sep. 28, 2021 received in PCT/JP2021/025368.
International Search Report dated Sep. 28, 2021 received in PCT/JP2021/025368.

* cited by examiner

*Primary Examiner* — Linh Giang Le
(74) *Attorney, Agent, or Firm* — Scully, Scott, Murphy & Presser, P.C.

(57) ABSTRACT

A detection unit has a function of detecting the end of an operation check mode for checking the operation of a medical device and detecting the start of a use mode for using the medical device. A record processing unit records information indicating that the medical device has been used once in a recording unit when the detection unit detects the end of the operation check mode and the start of the use mode.

14 Claims, 17 Drawing Sheets

FIG.3

| SCOPE ID | OPERATION CONFIRMED | USED |
|---|---|---|
| 1234 | 0 | 0 |

| SCOPE ID | OPERATION CONFIRMED | USED |
|---|---|---|
| 1234 | 1 | 1 |

| SCOPE ID | OPERATION CONFIRMED | USED |
|---|---|---|
| 1234 | 1 | 0 |

| SCOPE ID | OPERATION CONFIRMED | USED | FIRST DURATION |
|---|---|---|---|
| 1234 | 0 | 0 | — |

| SCOPE ID | OPERATION CONFIRMED | USED | FIRST DURATION |
|---|---|---|---|
| 1234 | 1 | 0 | 5:00 |

| SCOPE ID | OPERATION CONFIRMED | USED | FIRST DURATION |
|---|---|---|---|
| 1234 | 1 | 1 | 5:00 |

120

MEDICAL DEVICE MANAGEMENT SYSTEM, MEDICAL DEVICE, RELAY DEVICE, MEDICAL DEVICE MANAGEMENT METHOD AND RECORDING MEDIUM

CROSS-REFERENCE TO RELATED APPLICATIONS

This application is based upon and claims the benefit of priority from the International Application No. PCT/JP2021/025368, filed on Jul. 5, 2021, the entire contents of which are incorporated.

BACKGROUND

1. Field of the Disclosure

The present disclosure relates to a technology for managing the operating status of a medical device.

2. Description of the Related Art

Patent Literature 1 discloses a method for preventing the operation of a medical probe when it is determined that the medical probe has been previously used.

In Patent Literature 1, a medical probe is determined to have been used based on the time that has elapsed since the medical probe was first operated and/or the number of times the medical probe has been operated. Patent Literature 2 discloses a method for restricting the reuse of the medical probe based on the time that has elapsed since the medical probe was first used.

[Patent Literature 1] US Patent Publication No. 6578579
[Patent Literature 2] US Patent Publication No. 6651669

SUMMARY

In order to ensure medical safety and infection prevention, there are medical device products that are designed to be used only once. Such products are called single-use medical devices, and once those devices are used in a medical facility, the devices are collected by specialized collectors. Therefore, in medical facilities, the state of whether a single-use medical device has been used or has not been used needs to be properly managed. In this background, a purpose of the present disclosure is to provide a technology for managing the operating status of a medical device.

A medical device management system according to one embodiment of the present disclosure includes: a detection unit that has a function of detecting the end of an operation check mode for checking the operation of a medical device and detecting the start of a use mode for using the medical device; and a record processing unit that records information indicating that the medical device has been used once in a recording unit when the detection unit detects the end of the operation check mode and the start of the use mode.

A medical device according to another embodiment of the present disclosure includes: a detection unit detects switching from an operation check mode for checking the operation of a medical device to a use mode for using the medical device; and a record processing unit that records information indicating that the medical device has been used once in a recording unit when the detection unit detects the switching from the operation check mode to the use mode. The recording unit may be installed in the medical device, a connection device connecting to the medical device, or a server capable of communicating with the connection device.

A relay device according to yet another embodiment of the present disclosure is a relay device that connects a medical device and a control device, including: a detection unit that has a function of detecting the end of an operation check mode for checking the operation of a medical device and detecting the start of a use mode for using the medical device; and a record processing unit that records information indicating that the medical device has been used once in a recording unit when the detection unit detects the end of the operation check mode and the start of the use mode.

A medical device management method according to still another embodiment of the present disclosure includes: detecting the end of an operation check mode for checking the operation of a medical device; detecting the start of a use mode for using the medical device; and recording information indicating that the medical device has been used once in a recording unit after detecting the end of the operation check mode and the start of the use mode.

Optional combinations of the aforementioned constituting elements and implementations of the present disclosure in the form of methods, apparatuses, systems, recording mediums, and computer programs may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 3 is a diagram showing an example of a record of a recording unit that holds information indicating the operating status of an endoscope;

FIG. 5 is a diagram showing an example of a record of the recording unit that holds information indicating the operating status of an endoscope;

FIG. 6 is a diagram showing an example of a record of the recording unit that holds information indicating the operating status of an endoscope;

FIG. 14 is a diagram showing an example of a record of a recording unit that holds information indicating the operating status of an endoscope;

FIG. 17 is a diagram showing an example of a record of a recording unit that holds information indicating the operating status of an endoscope;

FIG. 19 is a diagram showing an example of a record of a recording unit that holds information indicating the operating status of the endoscope.

DETAILED DESCRIPTION

The disclosure will now be described by reference to the preferred embodiments. This does not intend to limit the scope of the present disclosure, but to exemplify the disclosure.

The present disclosure relates to a technology for managing the operating status of a medical device. In the following embodiments, medical devices are single-use endoscopes. Alternatively, the medical devices may be single-use medical devices other than endoscopes. Alternatively, the medical devices may be reusable medical devices for loan (including lease, etc.), which are loaned to a medical facility from the manufacturing facility, returned to the manufacturing facility after being used once at the medical facility, cleaned, sterilized, and inspected, and then stored in a container and loaned again to a medical facility.

Before an endoscope is used for an examination, the operation of the endoscope is checked by a medical professional such as a technician. The medical professional operates the operation part to check operation specified in predetermined check items, such as whether the insertion part properly bends and whether images captured by the endoscope are properly displayed on a display device. The procedure for the operation check is manualized. After connecting the endoscope to a control device and turning on the power, the medical personnel conducts the operation check according to a prescribed procedure. After confirming that there is no problem with the operation, the endoscope is inserted into a subject by a doctor and used for examination. In a medical device management system according to an embodiment, an endoscope is operated by a medical professional under an operation check mode, and then operated by a doctor under a use mode to be used for examination.

Figure 1:
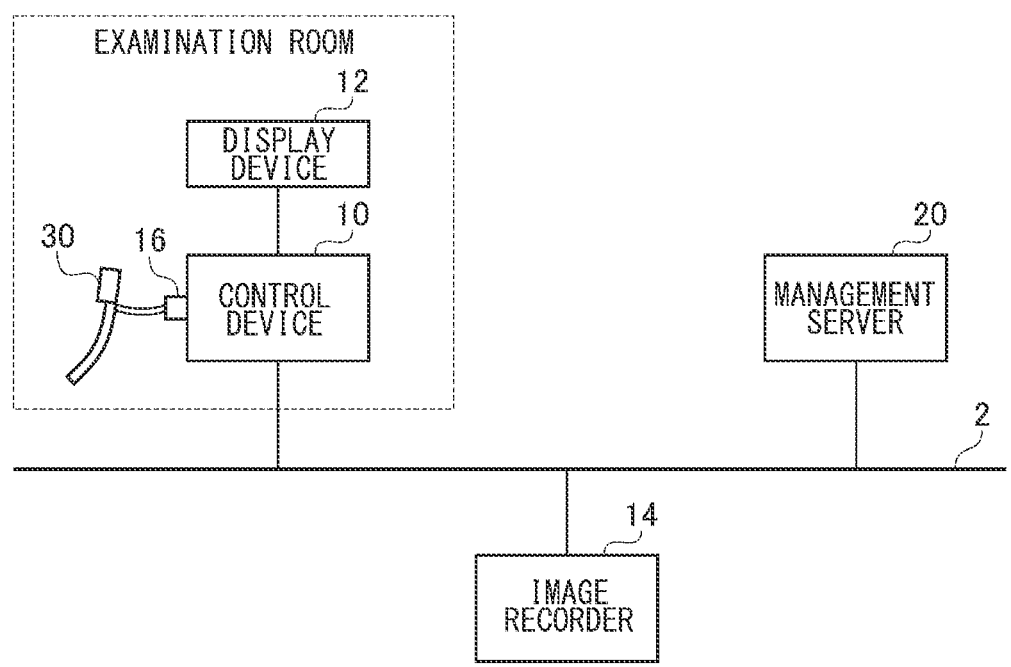
FIG. 1 is a diagram showing the configuration of a medical device management system.

FIG. 1 shows the configuration of a medical device management system 1 according to an embodiment. The medical device management system 1 includes a control device an image recorder 14, a management server 20, and an endoscope 30. The control device 10, the image recorder 14, and the management server 20 are communicably connected by a network 2 such as a local area network (LAN). The endoscope according to the embodiment is a single-use endoscope and is allowed to be used only once (used for insertion into a subject only once in a procedure).

The management server 20 manages a work schedule at a medical facility. In the embodiment, the management server 20 manages a schedule for endoscopic examinations. However, the management server 20 may also manage the schedule of medical work such as other types of examinations and surgeries.

In a medical facility, an order for an endoscopic examination (hereinafter also referred to as "examination order") is generated by an ordering system (not shown) and issued to the management server 20. The examination order includes order information related to the endoscopic examination such as the scheduled date and time of the start and end of the examination, patient identification information (patient ID) of a patient (subject), an examination type, a doctor in charge of the examination, and an examination room. Based on multiple examination orders issued by the ordering system, the management server 20 sets an examination schedule in which multiple endoscopic examination dates are set. Before the start of an endoscopic examination, a medical professional brings an endoscope 30 that matches the examination type into the examination room according to the examination schedule and connects the endoscope 30 to a connection part 16 of the control device 10.

When a medical professional operates a power switch provided in the control device 10 while the endoscope 30 is connected to the connection part 16, power is supplied to the endoscope 30, and the endoscope 30 is started in either an operation check mode, a use mode, or a function restriction mode. Once the endoscope 30 is started in the operation check mode, a medical personnel conducts an operation check of the endoscope 30 according to the procedure specified in the manual so as to confirm that the endoscope 30 operates normally.

After the operation check is completed, when a mode changeover switch is operated, the endoscope 30 transitions to the use mode for use in the examination. In the use mode, a doctor inserts the endoscope 30 into a subject, and the control device 10 displays an image of the subject being captured by the endoscope 30 on the display device 12. The doctor observes each part of an organ that is displayed and, upon finding a lesion, operates the release switch of the endoscope 30 so as to capture an image including the lesion. The control device 10 captures the image at the time when the release switch is operated and transmits the captured image to the image recorder 14. Upon the completion of the observation of all organs, the examination is completed. The control device 10 may transmit a plurality of captured images all at once to the image recorder 14 after the examination is completed.

The image recorder 14 is an image server that records images captured during an endoscopic examination and accumulates images transmitted from the control device 10 in association with the identification information (examination ID) of the examination. As metadata, the date and time of the image capturing, identification information of the endoscope 30 (hereinafter, also referred to as "scope ID"), information on the examination order, etc., may be added to a captured image.

Figure 2:
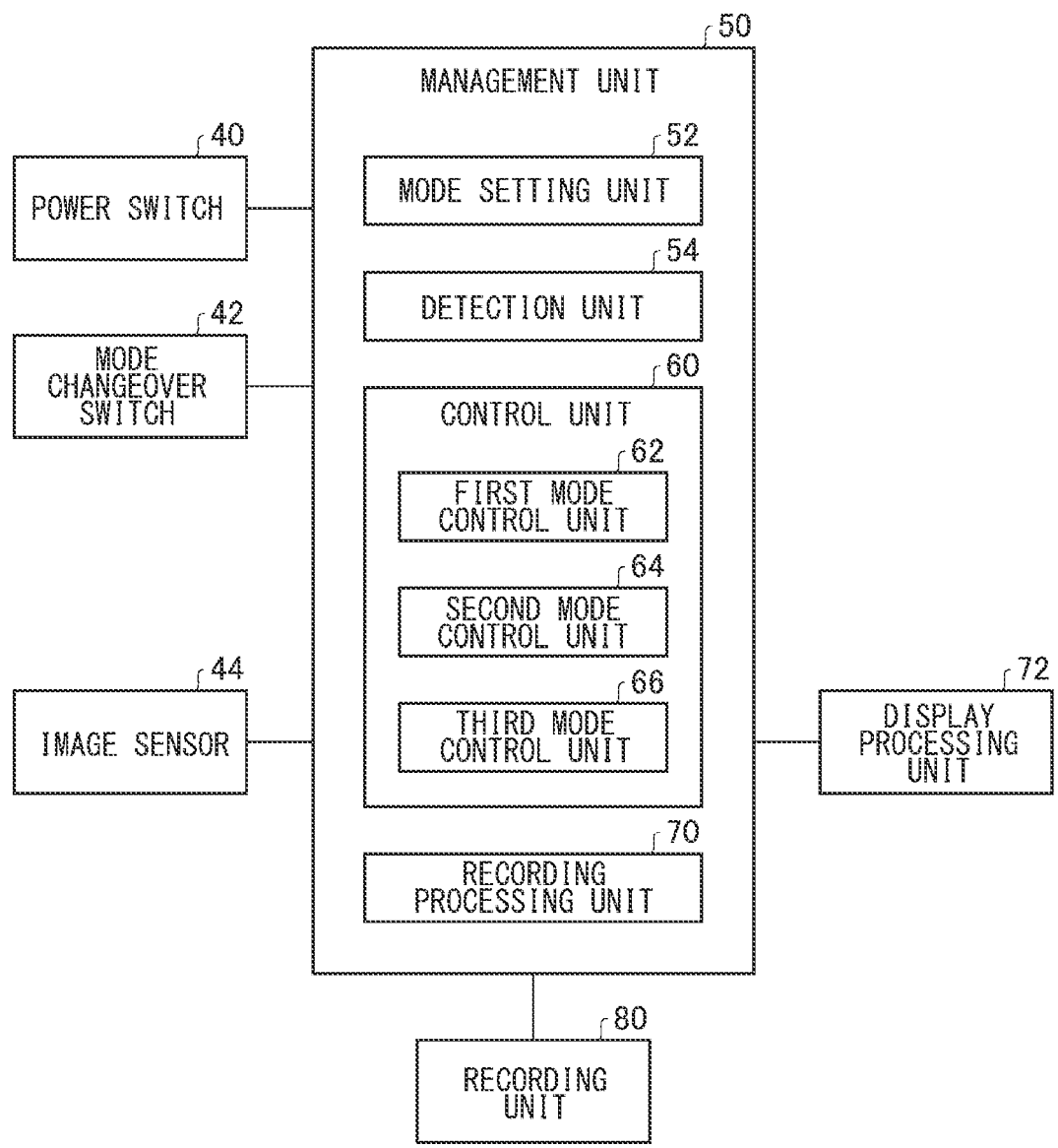
FIG. 2 is a diagram showing functional blocks of the medical device management system.

FIG. 2 shows functional blocks of the medical device management system 1 according to the embodiment. The medical device management system 1 has a function of managing the operating status of a single-use endoscope and includes a power switch 40, a mode changeover switch 42, an image sensor 44, a management unit 50, a display processing unit 72, and a recording unit 80. The management unit 50 has a mode setting unit 52, a detection unit 54, a control unit 60, and a recording processing unit 70. The control unit 60 has a function of controlling the function of an endoscope 30 and has a first mode control unit 62, a second mode control unit 64, and a third mode control unit 66. The first mode control unit 62 controls the function of the endoscope 30 in the operation check mode, the second mode control unit 64 controls the function of the endoscope 30 in the use mode, and the third mode control unit 66 restricts the function of the endoscope 30 in the function restriction mode.

The configuration shown in FIG. 2 is implemented by hardware such as an arbitrary processor, memory, auxiliary storage, or other LSIs and by software such as a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only, software only, or the combination of both.

The recording unit 80 records information indicating the operating status of the endoscope 30. FIG. 3 shows an example of a record of the recording unit 80 that holds information indicating the operating status of the endoscope 30. The recording unit 80 records information indicating the operating status in association with a scope ID "1234", which is the identification information of the endoscope 30.

An "operation confirmed" item is an item for recording information indicating the end of the operation check mode, where a flag value "1" indicates that the operation check mode has ended and a flag value "0" indicates that the operation check mode has not ended. A "used" item is an item for recording information indicating that the endoscope 30 has been used once, where a flag value "1" indicates that the endoscope 30 has been used for examination and a flag value "0" indicates that the endoscope has not been used for examination. In an example shown in FIG. 3, the "operation confirmed" and "used" items are each set to have a flag value "0", and, therefore, the operating status of the endoscope 30 is such that an operation check has not been performed and the endoscope 30 has not been used for examination.

Figure 4:
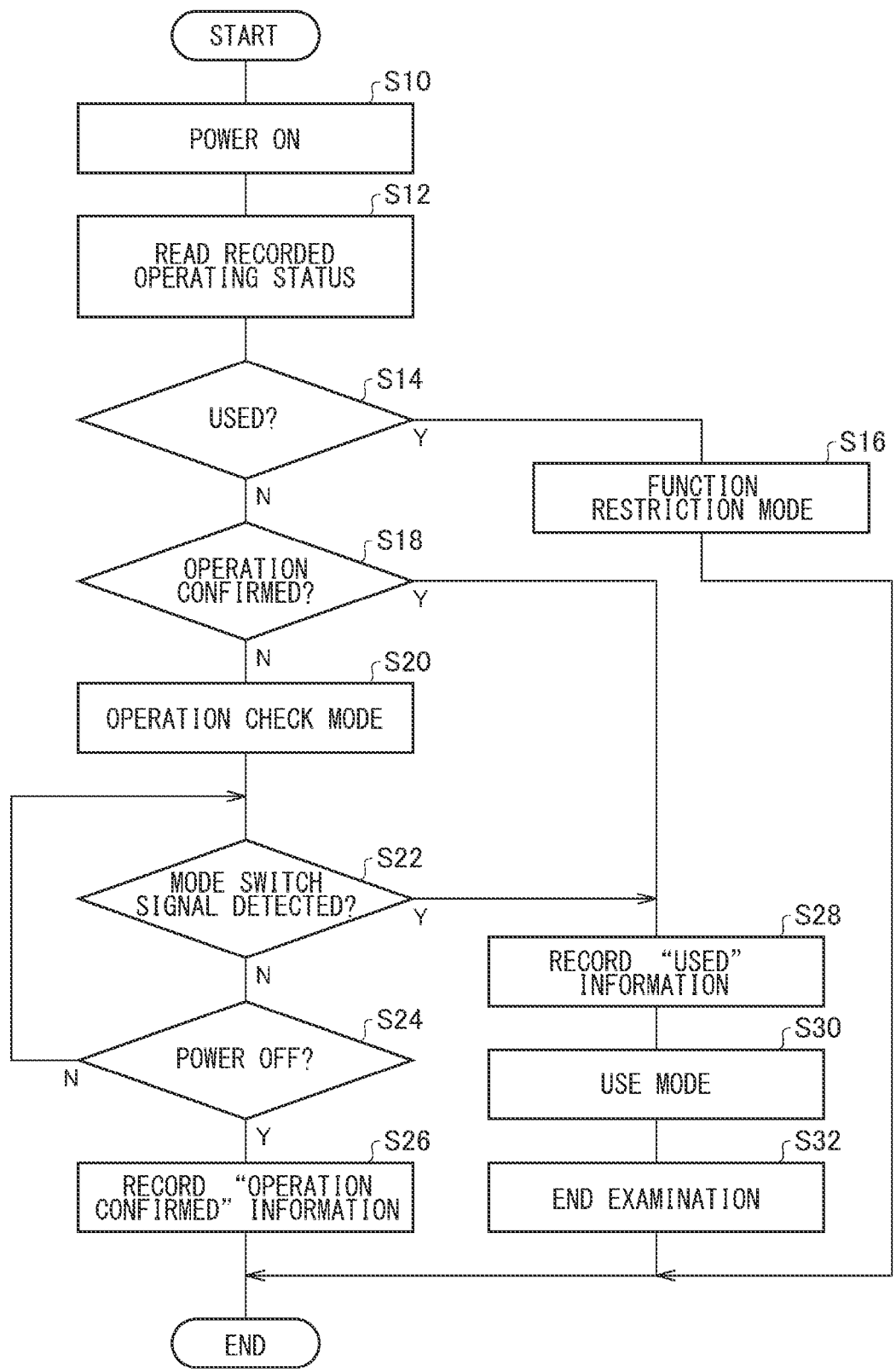
FIG. 4 is a diagram showing a flowchart for managing the operating status of a single-use endoscope.

FIG. 4 is a flowchart for managing the operating status of a single-use endoscope in the embodiment. The following explains the process used when the endoscope 30 in the operating status shown in FIG. 3 is connected to the connection part 16. Before the examination starts, when the endoscope 30 is connected to the connection part 16 and the power switch 40 provided on the control device 10 is turned on (S10), the control device 10 supplies power to the endoscope 30, and the mode setting unit 52 reads information indicating the operating status recorded in the recording unit 80 (S12). The recording unit 80 records information indicating whether or not the operation check mode has ended and whether or not the endoscope 30 has been used in association with the scope ID (see FIG. 3).

The mode setting unit 52 determines whether or not the information read from the recording unit 80 contains information indicating that the endoscope 30 has been used for examination (S14). If the information indicating that the endoscope 30 has not been used for examination is contained (N in S14), the mode setting unit 52 determines whether or not the information that has been read contains information indicating the end of the operation check mode (S18).

If the information indicating the end of the operation check mode is not contained (N in S18), the mode setting unit 52 sets the mode of the endoscope 30 to the operation check mode, and the first mode control unit 62 starts the endoscope 30 in the operation check mode (S20). As described, when the power switch 40 is turned on, if information indicating that the endoscope has not been used and that the operation check mode has not been ended is recorded in the recording unit 80 (see FIG. 3), the first mode control unit 62 starts the endoscope 30 in the operation check mode. During the operation of the endoscope 30 in the operation check mode, a medical professional conducts an operation check of the endoscope 30 according to the procedure specified in the manual so as to confirm that the endoscope 30 operates normally.

The first mode control unit 62 restricts the function of the endoscope 30 in the operation check mode more than the function of the endoscope 30 in the use mode. In other words, the function of the endoscope 30 in the operation check mode is restricted more than the function of the endoscope 30 in the use mode. The first mode control unit 62 may lower a function level, which indicates the level of the function of the endoscope 30, according to the time elapsed from when the operation check mode is started. The first mode control unit 62 may restrict the function of capturing images of the subject in the operation check mode, for example, at least one of a time for displaying an image captured by the image sensor 44 on the display device 12, a display area for the image on the display device 12, and the quality of the displayed image may be restricted according to elapsed time.

More specifically, the first mode control unit 62 may restrict the display time of an image captured by the image sensor 44 in the operation check mode to a predetermined time (e.g., 10 seconds). Further, the first mode control unit 62 may narrow the display area for the image on the display device 12 over time or lower the quality of the displayed image over time. In this way, the first mode control unit 62 lowers the function level of the endoscope 30 according to the elapsed time in the operation check mode, thereby allowing the medical professional to be given a chance for switching the mode from the operation check mode to the use mode after the operation check is completed.

In the operation check mode, the detection unit 54 monitors the operation on the mode changeover switch 42 (N in S22). The mode changeover switch 42 is has a role of generating a signal for switching the mode from the operation check mode to the use mode. The mode changeover switch 42 may be provided on the endoscope 30 or on the control device 10. Before the power switch 40 is turned off (N in S24), the mode changeover switch 42 generates a mode switching signal when a medical professional performs the operation of pressing the mode changeover switch 42 after the operation check of the endoscope 30 is completed.

By detecting the mode switch signal, the detection unit 54 detects switching from the operation check mode to the use mode and detects the end of the operation check mode and the start of the use mode (Y in S22). When the detection unit 54 detects the end of the operation check mode and the start of the use mode, the mode setting unit 52 sets the mode of the endoscope 30 to the use mode, and the recording processing unit 70 records information indicating that the endoscope 30 has been used once in the recording unit 80 (S28).

FIG. 5 shows an example of a record of the recording unit 80 that holds information indicating the operating status of the endoscope 30. When the detection unit 54 detects the end of the operation check mode and the start of the use mode, the recording processing unit 70 sets the flag value "1" in the "operation confirmed" and "used" items of a record shown in FIG. 3, respectively. Therefore, an operating status indicating that the operating check has been performed and that the endoscope has been used for examination is recorded in the recording unit 80.

When the mode setting unit 52 sets the use mode, the second mode control unit 64 controls the function of the endoscope 30 in the use mode (S30). The second mode control unit 64 can perform the full functions of the endoscope 30, and in the use mode, the function restriction in the operation check mode is removed. The doctor inserts the endoscope 30 into the subject, and the display processing unit 72 displays an image of the subject being captured by the image sensor 44 on the display device 12. At this time, the second mode control unit 64 may display the image of the subject captured by the image sensor 44 in the highest quality on the entire screen without any time limitation. When the doctor finishes observing all organs, the examination is ended (S32).

In S22, if the power switch 40 is turned off (Y in S24) before the mode changeover switch 42 is operated (N in S22), the detection unit 54 detects the end of the operation check mode. When the detection unit 54 detects the end of the operation check mode, the mode setting unit 52 cancels the mode that has been set, and the recording processing unit 70 records information indicating the end of the operation check mode in the recording unit 80 (S26).

FIG. 6 shows an example of a record of the recording unit 80 that holds information indicating the operating status of the endoscope 30. When the detection unit 54 detects the end of the operation check mode, the recording processing unit 70 sets the flag value "1" in the "operation confirmed" item of the record shown in FIG. 3. Therefore, an operating status indicating that the operation check has been performed and that the endoscope has not been used for examination is recorded in the recording unit 80.

The following explains the process used when the endoscope 30 in the operating status shown in FIG. 6 is connected to the connection part 16. Before the examination starts, when the endoscope 30 is connected to the connection part 16 and the power switch 40 provided on the control device 10 is turned on (S10), the control device 10 supplies power to the endoscope 30, and the mode setting unit 52 reads information indicating the operating status recorded in the recording unit 80 (S12).

The mode setting unit 52 determines that the information read from the recording unit 80 (see FIG. 6) contains information indicating that the endoscope 30 has not been used for examination (N in S14) and that the operation check mode has ended (Y in S18). At this time, the mode setting unit 52 sets the mode of the endoscope 30 to the use mode, and the recording processing unit 70 records information indicating that the endoscope 30 has been used once in the recording unit 80 (S28). More specifically, the recording processing unit 70 sets the flag value "1" in the "used" item in a record shown in FIG. 6. Therefore, an operating status indicating that the operating check has been performed and that the endoscope has been used for examination is recorded in the recording unit 80. FIG. 5 shows the operating status recorded in the recording unit 80 at this time.

When the mode setting unit 52 sets the use mode, the second mode control unit 64 controls the function of the endoscope 30 in the use mode such that the examination starts (S30). The display processing unit 72 displays an image captured by the image sensor 44 on the display device 12, and when the doctor finishes observing all the organs, the examination is ended (S32).

The following explains the process used when the endoscope 30 in the operating status shown in FIG. 5 is connected to the connection part 16. Before the examination starts, when the endoscope 30 is connected to the connection part 16 and the power switch 40 provided on the control device 10 is turned on (S10), the control device 10 supplies power to the endoscope 30, and the mode setting unit 52 reads information indicating the operating status recorded in the recording unit 80 (S12).

The mode setting unit 52 determines that the information read from the recording unit 80 (see FIG. 5) contains information indicating that the endoscope 30 has been used for the examination (Y in S14). At this time, the mode setting unit 52 sets the mode of the endoscope 30 to the function restriction mode, and the third mode control unit 66 restricts the function of the endoscope 30 (S16).

The third mode control unit 66 restricts the function of the endoscope 30 such that the doctor is practically unable to use the endoscope 30. For example, the third mode control unit 66 may stop supplying power to the endoscope 30 such that image-capturing of the subject cannot be performed. Alternatively, without restricting the image capturing by the image sensor 44, the third mode control unit 66 may stop the power supply to the display device 12 such that captured images cannot be displayed. The third mode control unit 66 may blur or partially hide a captured image displayed on the display device 12 or display a message on the captured image indicating that the endoscope 30 cannot be used, thereby practically preventing the doctor from using the endoscope 30. By restricting the function of the endoscope 30 in this manner, the third mode control unit 66 can practically prevent reuse of the endoscope 30 that has been used once.

In the medical device management system 1, the functional blocks shown in FIG. 2 may be mounted in various configurations. The power switch 40 is mounted on the control device 10, and the illustration thereof is omitted in the following exemplary embodiments.

First Exemplary Embodiment

Figure 7:
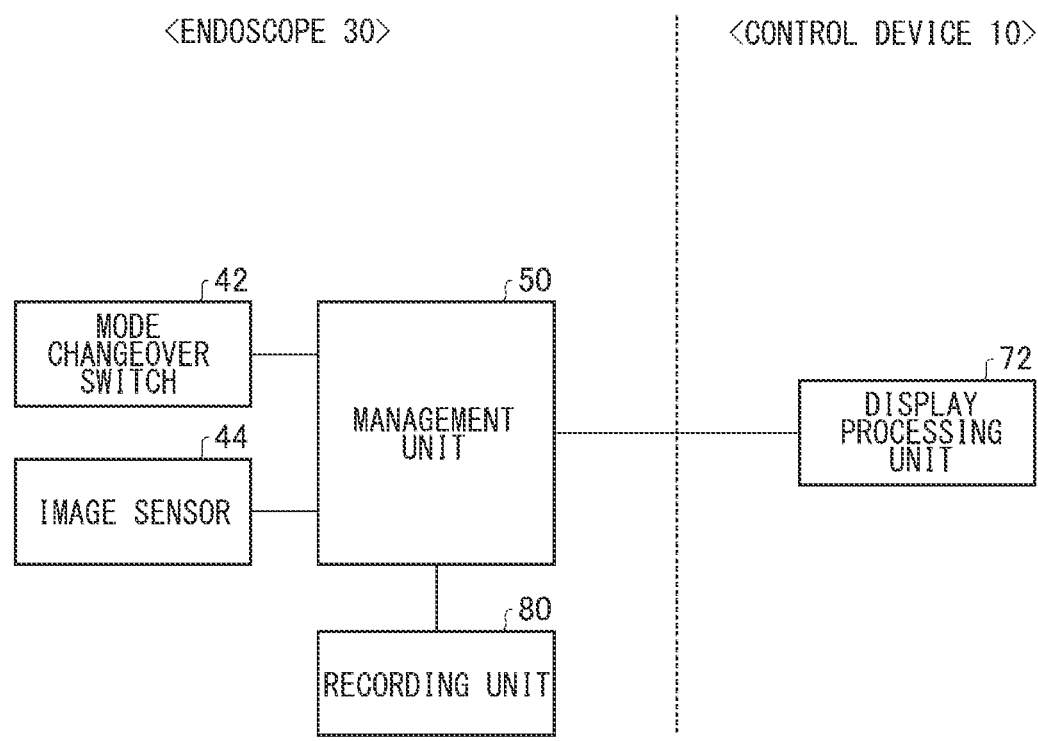
FIG. 7 is a diagram showing functional blocks of a medical device management system according to a first exemplary embodiment.

FIG. 7 shows functional blocks of a medical device management system 1 according to the first exemplary embodiment. A management unit 50 is configured including a mode setting unit 52, a detection unit 54, a control unit 60, and a recording processing unit 70 (see FIG. 2). In the first exemplary embodiment, an endoscope 30 includes a mode changeover switch 42, an image sensor 44, a management unit 50, and a recording unit 80, and a control device 10 includes a display processing unit 72. According to the medical device management system 1 of the first exemplary embodiment, by providing the mode changeover switch 42, the management unit 50, and the recording unit 80 in the endoscope 30, it becomes unnecessary to add new functions to the control device 10.

The mode changeover switch 42 may be one or more specific operation buttons provided on the endoscope 30 to which a mode switching function is assigned, and the detection unit 54 detects a mode switching signal generated by the operation of pressing the specific operation button. The detection unit 54 may detect a mode switching signal when a specific operation button is long pressed. The detection unit 54 may detect a mode switching signal when a plurality of specific operation buttons are operated simultaneously.

Second Exemplary Embodiment

Figure 8:
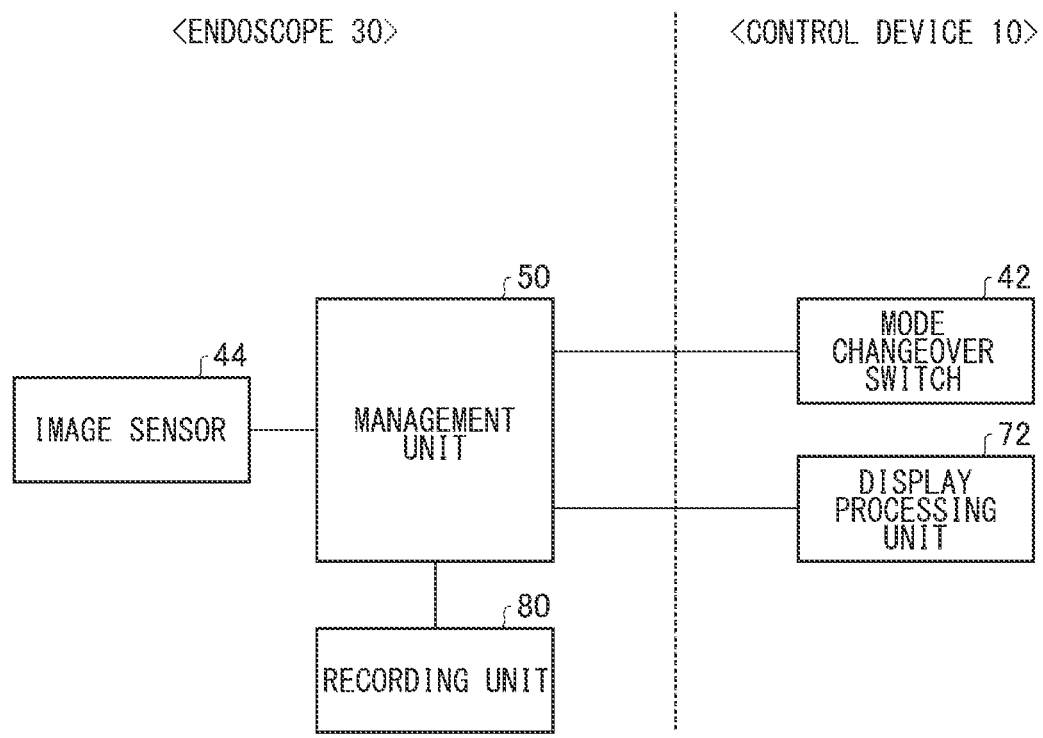
FIG. 8 is a diagram showing functional blocks of a medical device management system according to a second exemplary embodiment.

FIG. 8 shows functional blocks of a medical device management system 1 according to the second exemplary embodiment. A management unit 50 is configured including a mode setting unit 52, a detection unit 54, a control unit 60, and a recording processing unit 70 (see FIG. 2). In the second exemplary embodiment, an endoscope 30 includes an image sensor 44, a management unit 50, and a recording unit and a control device 10 includes a mode changeover switch 42 and a display processing unit 72. Compared to the first exemplary embodiment, in the second exemplary embodiment, the mode changeover switch 42 is provided on the control device 10, and a medical professional operates the mode changeover switch 42 provided on the control device 10 so as to switch modes. Since the mode changeover switch 42 is provided in the control device 10, the possibility that a medical professional accidentally operates the mode changeover switch 42 when checking the operation of the endoscope 30 can be reduced.

Third Exemplary Embodiment

Figure 9:
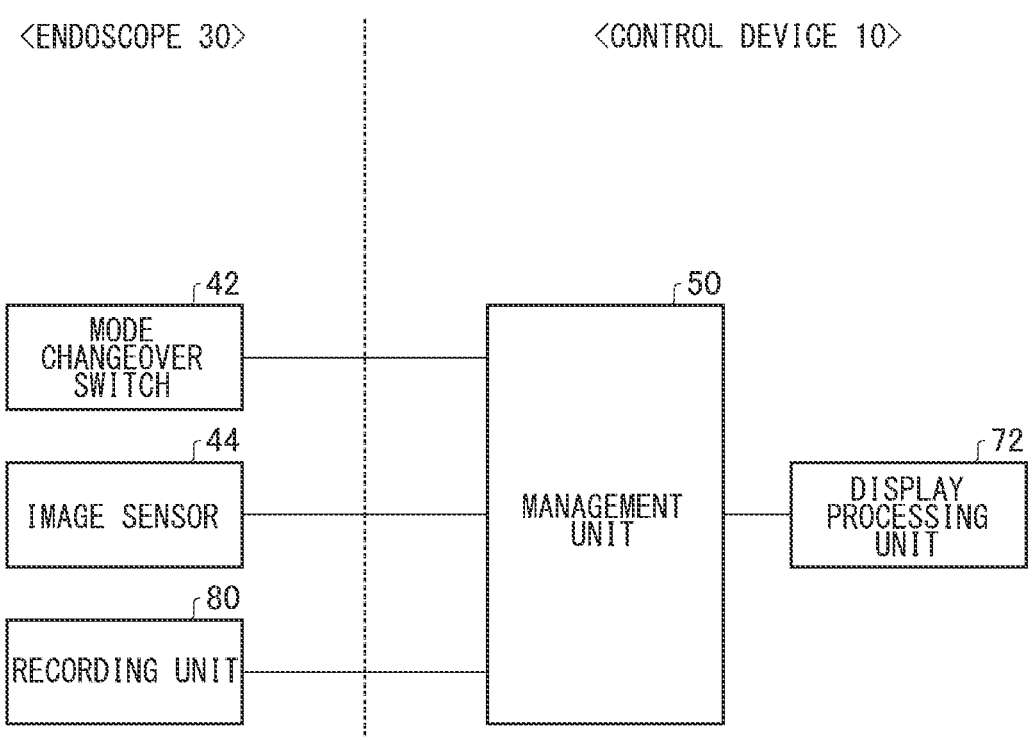
FIG. 9 is a diagram showing functional blocks of a medical device management system according to a third exemplary embodiment.

FIG. 9 shows functional blocks of a medical device management system 1 according to the third exemplary embodiment. A management unit 50 is configured including a mode setting unit 52, a detection unit 54, a control unit 60, and a recording processing unit 70 (see FIG. 2). In the third exemplary embodiment, an endoscope 30 includes a mode changeover switch 42, an image sensor 44, and a recording unit 80, and a control device 10 includes a management unit 50 and a display processing unit 72. In the third exemplary embodiment, by providing the management unit 50 in the control device 10, the function of the management unit 50 do not need to be provided in the endoscope 30, and the endoscope 30 can be manufactured at a low cost.

Fourth Exemplary Embodiment

Figure 10:
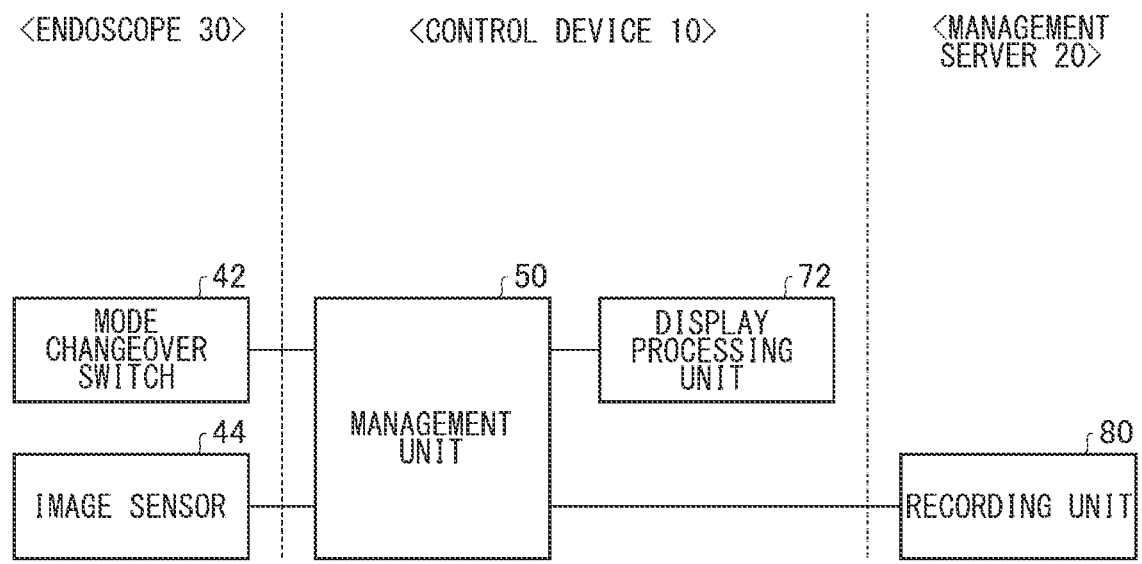
FIG. 10 is a diagram showing functional blocks of a medical device management system according to a fourth exemplary embodiment.

FIG. 10 shows functional blocks of a medical device management system 1 according to the fourth exemplary embodiment. A management unit 50 is configured including a mode setting unit 52, a detection unit 54, a control unit 60, and a recording processing unit 70 (see FIG. 2). In the fourth exemplary embodiment, an endoscope 30 includes a mode changeover switch 42 and an image sensor 44, a control device includes a management unit 50 and a display processing unit 72, and a management server 20 includes a recording unit 80. In the fourth exemplary embodiment, by providing the recording unit 80 in the management server 20, it is not necessary to provide a recording unit in the endoscope 30.

In S26 and S28 in FIG. 4, the recording processing unit 70 records information indicating the operating status of the endoscope 30 in the recording unit 80 provided in the management server 20 in association with identification information of the endoscope 30. As shown in FIG. 3, FIG. 5, and FIG. 6, by recording information indicating the operational status in association with a scope ID, the management unit 50 can appropriately manage the operational status of a plurality of endoscopes 30.

Fifth Exemplary Embodiment

Figure 11:
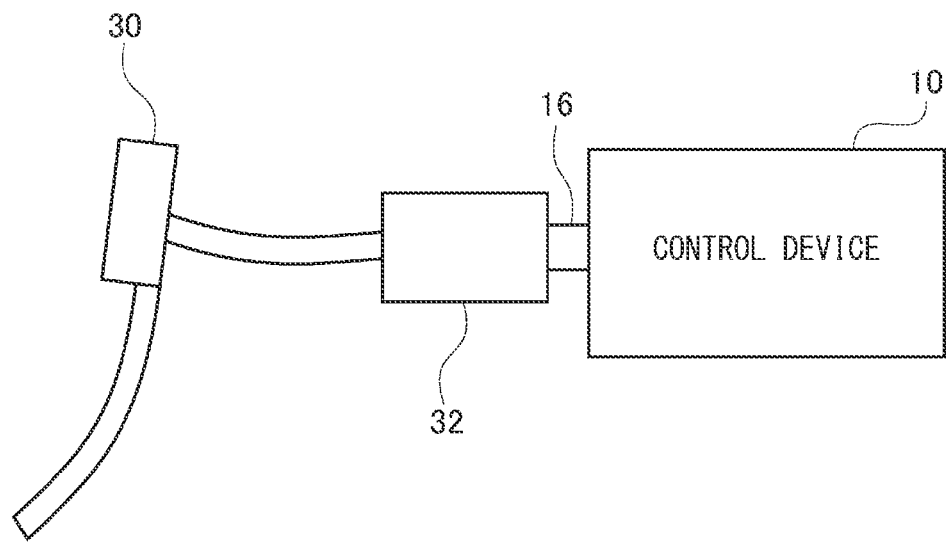
FIG. 11 is a diagram showing an example of a state in which an endoscope and a control device are connected.

FIG. 11 shows an example of a state in which an endoscope 30 and a control device 10 are connected. In the fifth exemplary embodiment, the medical device management system 1 includes a relay device 32 that connects the endoscope 30 and the control device 10. The relay device 32 intervenes between the endoscope 30 and the control device 10 and has a function of transmitting and receiving signals between the endoscope 30 and the control device 10.

Figure 12:
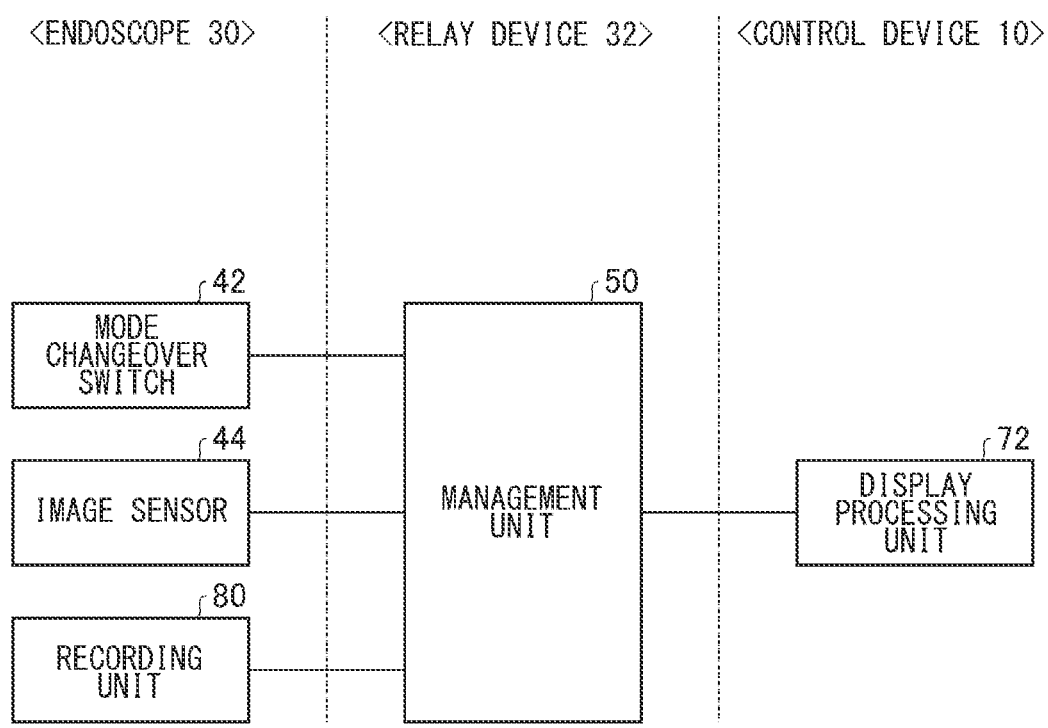
FIG. 12 is a diagram showing functional blocks of a medical device management system according to a fifth exemplary embodiment.

FIG. 12 shows functional blocks of a medical device management system 1 according to the fifth exemplary embodiment. A management unit 50 is configured including a mode setting unit 52, a detection unit 54, a control unit 60, and a recording processing unit 70 (see FIG. 2). In the fifth exemplary embodiment, an endoscope 30 includes a mode changeover switch 42, an image sensor 44, and a recording unit 80, a relay device 32 includes a management unit 50, and a control device 10 includes a display processing unit 72. The mode changeover switch 42 and the recording unit 80 may be provided in the relay device 32. In this case, since all functions for managing the operating status of the endoscope can be provided in the relay device 32, there is no need to provide functions for managing the operating status in the endoscope 30 and the control device 10.

Described above is an explanation on the present disclosure based on the embodiments and the exemplary embodiments. These exemplary embodiments are intended to be illustrative only, and it will be obvious to those skilled in the art that the exemplary embodiments may be combined, that various exemplary variations can be developed for constituting elements and processes, and that further exemplary variations may be combined with the exemplary embodiments.

Figure 13:
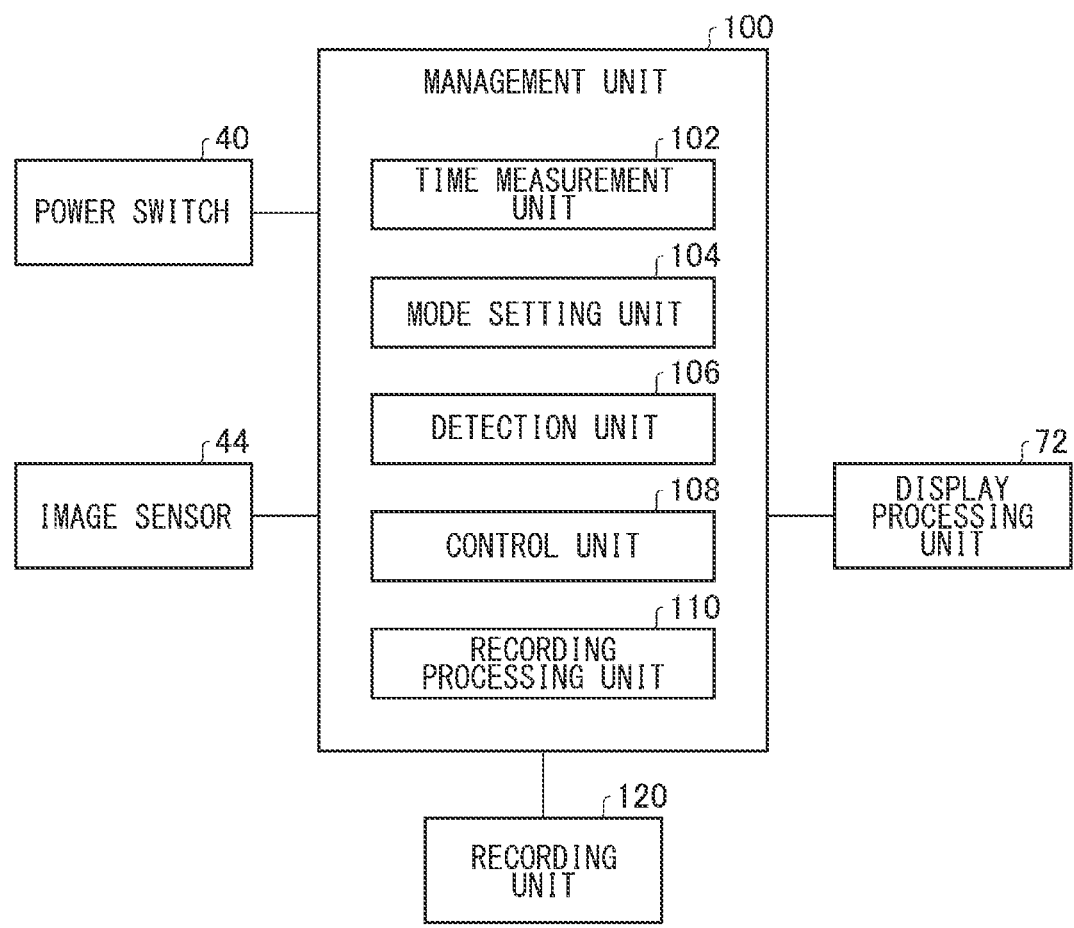
FIG. 13 is a diagram showing functional blocks of a medical device management system according to an exemplary variation.

FIG. 13 shows functional blocks of a medical device management system 1 according to an exemplary variation. The medical device management system 1 includes a power switch 40, an image sensor 44, a management unit 100, a display processing unit 72, and a recording unit 120. The management unit 100 has a time measurement unit 102, a mode setting unit 104, a detection unit 106, a control unit 108, and a recording processing unit 110. The time measurement unit 102 measures the time during which power is supplied to an endoscope 30.

The configuration shown in FIG. 13 is implemented by hardware such as an arbitrary processor, memory, auxiliary storage, or other LSIs and by software such as a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only, software only, or the combination of both.

The recording unit 120 records information indicating the operating status of the endoscope 30. FIG. 14 shows an example of a record of the recording unit 120 that holds information indicating the operating status of the endoscope 30. The recording unit 120 records information indicating the operating status and a first duration in association with a scope ID "1234", which is the identification information of the endoscope 30.

An "operation confirmed" item is an item for recording information indicating the end of the operation check mode, where a flag value "1" indicates that the operation check mode has ended and a flag value "0" indicates that the operation check mode has not ended. A "used" item is an item for recording information indicating that the endoscope 30 has been used once, where a flag value "1" indicates that the endoscope 30 has been used and a flag value "0" indicates that the endoscope has not been used for examination. In an example shown in FIG. 14, the "operation confirmed" and "used" items are each set to have a flag value "0", and, therefore, the operating status of the endoscope 30 is such that an operation check has not been performed and the endoscope 30 has not been used for examination.

A "first duration" item is an item for recording the power supply time spent when power is first supplied to the endoscope 30. If power has not yet been supplied to the endoscope 30, no value is registered in the "first duration" item, and the item is left blank.

Figure 15:
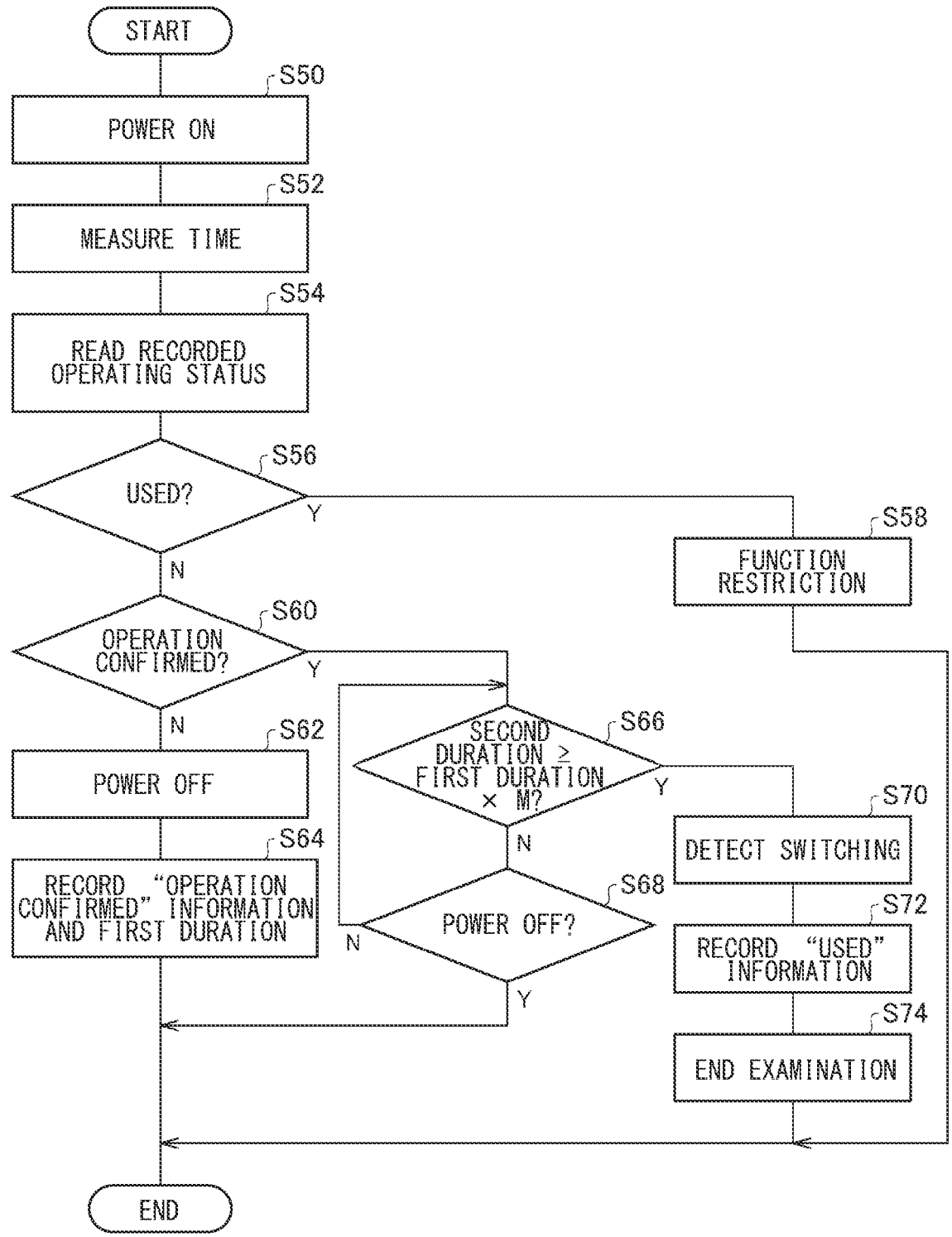
FIG. 15 is a diagram showing a flowchart for managing the operating status of a single-use endoscope in the exemplary variation.
Figure 16A:
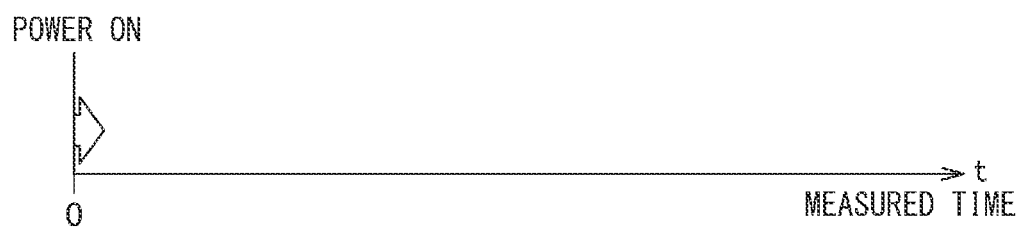
FIGS. 16A to 16B are diagrams showing power supply time at the time of initial startup.

FIG. 15 is a flowchart for managing the operating status of a single-use endoscope in the exemplary variation. The following explains the process used when the endoscope 30 in the operating status shown in FIG. 14 is connected to the connection part 16. Before the examination starts, when the endoscope 30 is connected to the connection part 16 and the power switch 40 provided on the control device 10 is turned on (S50), the control device 10 supplies power to the endoscope 30, and the time measurement unit 102 starts measuring the power supply time (S52). In other words, the time measurement unit 102 measures the time that elapses after the power supply to the endoscope 30 is started. FIG. 16A shows the power supply time at which the measurement by the time measurement unit 102 starts at the time of initial startup of the endoscope 30. The time measurement unit 102 starts a time counter at the same time as the start of the power supply and measures the time during which the control device 10 supplies power to the endoscope 30.

The mode setting unit 104 reads information indicating the operating status recorded in the recording unit 120 (S54). The recording unit 120 records information indicating whether or not the operation check mode has ended and whether or not the endoscope 30 has been used in association with the scope ID (see FIG. 14).

The mode setting unit 104 determines whether or not the information read from the recording unit 120 contains information indicating that the endoscope 30 has been used for examination (S56). If the information indicating that the endoscope 30 has not been used for examination is contained (N in S56), the mode setting unit 104 determines whether or not the information that has been read contains information indicating the end of the operation check mode (S60).

If the information indicating the end of the operation check mode is not contained (N in S60), the mode setting unit 104 sets the mode of the endoscope 30 to the operation check mode, and the control unit 108 starts the endoscope 30 in the operation check mode. As described, when the power switch 40 is turned on, if information indicating that the endoscope has not been used and that the operation check mode has not been ended is recorded in the recording unit 120 (see FIG. 14), the control unit 108 starts the endoscope 30 in the operation check mode. During the operation of the endoscope 30 in the operation check mode, a medical professional conducts an operation check of the endoscope 30 according to the procedure specified in the manual so as to confirm that the endoscope 30 operates normally. In the exemplary variation, the control unit 108 may make the function of the endoscope 30 in the operation check mode the same as those of the endoscope 30 in the use mode.

When a medical professional turns off the power switch 40 after the end of the operation check of the endoscope 30 (S62), the power supply to the endoscope 30 is ended, and the detection unit 106 detects the end of the operation check mode. When the detection unit 106 detects the end of the operation check mode, the mode setting unit 52 cancels the mode that has been set. The time measurement unit 102 stops counting up the time counter when the power switch 40 is turned off.

Figure 16B:
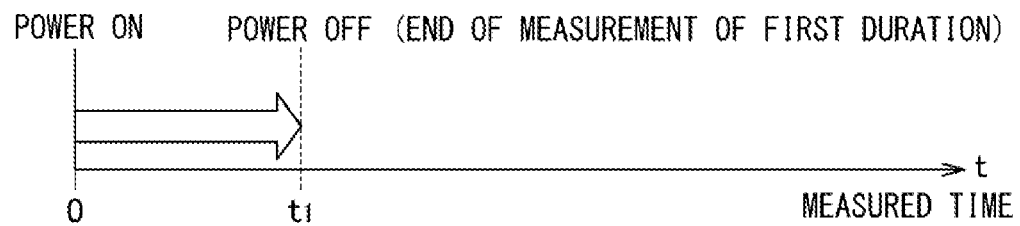

FIG. 16B shows the power supply time at which the measurement by the time measurement unit 102 has ended. The time measurement unit 102 acquires a count value at the end of the power supply, that is, the time that elapses from the start of the power supply to the endoscope 30 to the end of the power supply (hereinafter referred to as "first duration"). The recording processing unit 110 records a first duration $t_1$ measured by the time measurement unit 102 in the recording unit 120 along with information indicating the end of the operation check mode (S64).

FIG. 17 shows an example of a record of the recording unit 120 that holds information indicating the operating status of the endoscope 30. When the detection unit 106 detects the end of the operation check mode, the recording processing unit 110 sets the flag value "1" in the "operation confirmed" item of the record shown in FIG. 14 and registers the measured time $t_1$ (five minutes in this example) in a "first duration" item. Therefore, an operating status indicating that the operation check has been performed, that it took five minutes for the operation check, and that the endoscope has not been used for examination is recorded in the recording unit 120.

The following explains the process used when the endoscope 30 in the operating status shown in FIG. 17 is connected to the connection part 16. Before the examination starts, when the endoscope 30 is connected to the connection part 16 and the power switch 40 provided on the control device 10 is turned on (S50), the control device 10 supplies power to the endoscope 30, and the time measurement unit 102 starts measuring the power supply time (S52).

Figure 18A:
FIGS. 18A to 18D are diagrams showing power supply time at the time of a startup occurring after the initial startup.

FIG. 18A shows the power supply time at which the measurement by the time measurement unit 102 has started. The time measurement unit 102 starts the time counter at the same time as the start of the power supply and measures the time during which the control device 10 supplies power to the endoscope 30.

The mode setting unit 104 reads information indicating the operating status recorded in the recording unit 120 (S54). The mode setting unit 104 determines that the information read from the recording unit 120 (see FIG. 17) contains information indicating that the endoscope 30 has not been used for examination (N in S56) and contains information indicating that the operation check mode has ended (Y in S60). The mode setting unit 104 sets the mode of the endoscope 30 to the operation check mode, and the control unit 108 starts the endoscope 30 in the operation check mode.

The detection unit 106 monitors the time being measured by the time measurement unit 102 (second duration) and compares the second duration being counted up with M times (M is greater than one) the first duration (five minutes) recorded in the recording unit 120 (S66). For example, M may be a predetermined value greater than or equal to two.

Figure 18B:
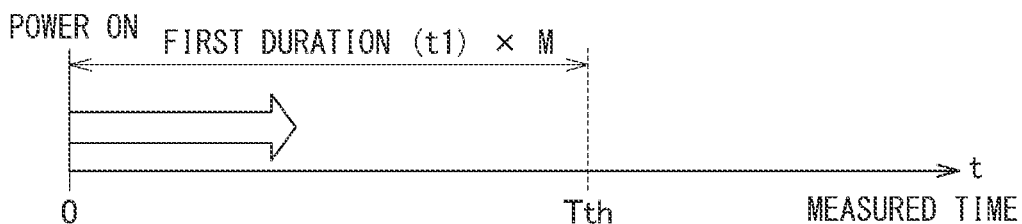

FIG. 18B shows the power supply time (second duration) being measured by the time measurement unit 102. If the second duration is less than $T_{th}$ (=first duration×M) (N in S66), the detection unit 106 does not detect switching from the operation check mode to the use mode, and unless the power switch 40 is turned off (N in S68), the detection unit 106 continues comparing the second duration being counted up with $T_{th}$. If the power switch 40 is turned off (Y in S68) before the second duration becomes equal to or more than $T_{th}$, the detection unit 106 detects the end of the operation check mode, and the mode setting unit 52 cancels the mode that has been set.

Figure 18C:
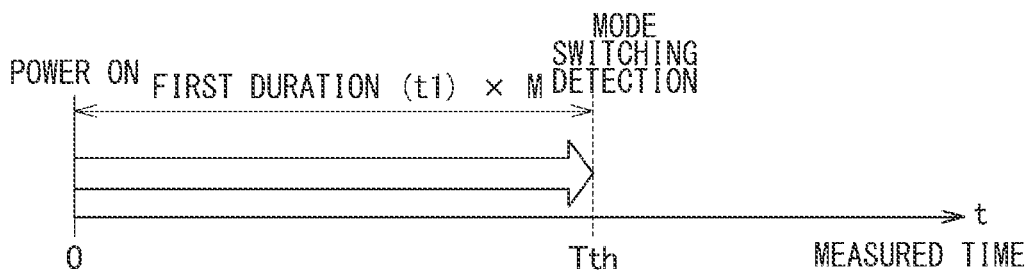

FIG. 18C shows the power supply time (second duration) being measured by the time measurement unit 102. If the second duration measured by the time measurement unit 102 becomes equal to or more than $T_{th}$ (Y in S66), the detection unit 106 detects switching from the operation check mode to the use mode and detects the end of the operation check mode and the start of the use mode (S70). At this time, the mode setting unit 104 sets the mode of the endoscope 30 to the use mode, and the recording processing unit 110 records information indicating that the endoscope 30 has been used once in the recording unit 120 (S72). More specifically, the recording processing unit 70 sets the flag value "1" in the "used" item in a record shown in FIG. 17. Therefore, an operating status indicating that the operating check has been performed and that the endoscope has been used for examination is recorded in the recording unit 120. FIG. 19 shows an example of a record of the recording unit 120 that holds information indicating the operating status of the endoscope 30. When the detection unit 106 detects the end of the operation check mode and the start of the use mode, the recording processing unit 110 sets the flag value "1" in the "used" item. Therefore, an operating status indicating that the operating check has been performed and that the endoscope has been used for examination is recorded in the recording unit 120.

The control unit 108 controls the function of the endoscope 30 in the use mode. The display processing unit 72 displays an image captured by the image sensor 44 on the display device 12, and when the doctor finishes observing all the organs, the power switch 40 is turned off, and the examination is ended (S74).

Figure 18D:
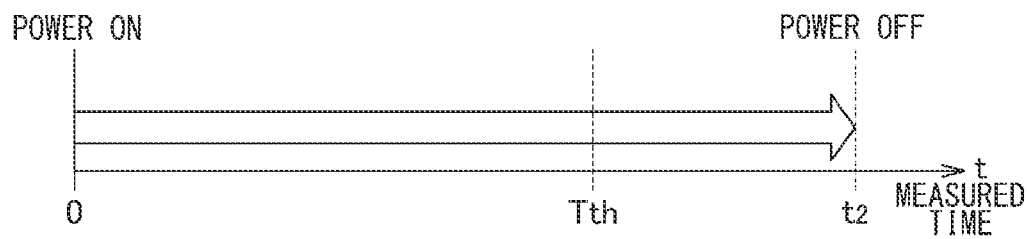

The time measurement unit 102 stops counting up the time counter when the power switch 40 is turned off. FIG. 18D shows the power supply time at which the measurement by the time measurement unit 102 has ended.

The following explains the process used when the endoscope 30 in the operating status shown in FIG. 19 is connected to the connection part 16. Before the examination starts, when the endoscope 30 is connected to the connection part 16 and the power switch 40 provided on the control device 10 is turned on (S50), the control device 10 supplies power to the endoscope 30, and the time measurement unit 102 starts measuring the power supply time (S52). The mode setting unit 104 reads information indicating the operating status recorded in the recording unit 120 (S54).

The mode setting unit 104 determines that the information read from the recording unit 120 (see FIG. 19) contains information indicating that the endoscope 30 has been used for the examination (Y in S56). At this time, the mode setting unit 104 sets the mode of the endoscope 30 to the function restriction mode, and the control unit 108 restricts the function of the endoscope 30 (S58). The control unit 108 may restrict the function of the endoscope 30 such that the doctor is practically unable to use the endoscope 30. By restricting the function of the endoscope in this manner, the control unit 108 can practically prevent reuse of the endoscope 30 that has been used once.

In this exemplary variation, on the assumption that an operation check is performed at the time of the initial startup, it is determined that the endoscope 30 has been used in examination when the power supply time at the next or subsequent startup is equal to or more than a predetermined multiple (M times) of the power supply time (first duration) at the initial startup. On the other hand, considering a case where the endoscope 30 is suddenly used for examination without an operation check at the initial startup, the detection unit 106 may perform mode determination based on the length of the power supply time (first duration) at the initial startup. More specifically, the detection unit 106 may detect the end of the operation check mode when the first duration, i.e., the time during which the power supply has continued after the initial startup is less than a predetermined time and may detect the end of the operation check mode and the start of the use mode when the first duration is equal to or more than the predetermined time. The predetermined time, which serves as a threshold for comparison, may be set to a time slightly longer than the maximum time for conducting the operation check and may be set to, e.g., eight minutes.

In the embodiment, the management server 20 is installed in a medical facility. Alternatively, the management server 20 may be installed in an external system outside the medical facility.

What is claimed is:

1. A medical device management system, comprising:
    a controller comprising hardware, the controller being configured to:
        detect an end of an operation check mode for checking an operation of a medical device and detect a start of a use mode for using the medical device;
        record information indicating that the medical device has been used once when the end of the operation check mode and the start of the use mode are detected;
        measure a time during which power is supplied to the medical device,
        record a first duration measured from a start of the power supply to the medical device to an end of the power supply, and
        detect the end of the operation check mode and the start of the use mode when a measured second duration becomes longer than the first duration;
    wherein the controller is configured to restrict a function of the medical device based on the recorded information by one of:
        stopping the power supply to the medical device;
        blurring or partially hiding a captured image displayed on the device; or
        displaying a message on the captured image that the endoscope cannot be used.

2. The medical device management system according to claim 1, wherein the controller detects the end of the operation check mode and the start of the use mode when the second duration becomes M times the first duration or more, wherein M is greater than one.

3. The medical device management system according to claim 2, wherein the controller does not detect the end of the operation check mode or the start of the use mode when the measured second duration is less than M times the first duration.

4. The medical device management system according to claim 1,
    wherein the controller:
        records information indicating the end of the operation check mode after the detection of the end of the operation check mode, and
        starts the medical device in the operation check mode when the information indicating the end of the operation check mode is not recorded.

5. The medical device management system according to claim 1, wherein the controller detects the end of the operation check mode and the start of the use mode by detecting switching from the operation check mode to the use mode.

6. The medical device management system according to claim 1, wherein the controller detects the end of the operation check mode when the power of the medical device is turned off in the operation check mode.

7. The medical device management system according to claim 1, wherein a function of the medical device in the operation check mode is restricted more than the function of the medical device in the use mode.

8. The medical device management system according to claim 7, wherein the controller lowers a function level, which indicates the level of the function of the medical device, in the operation check mode according to time elapsed from when the operation check mode is started.

9. The medical device management system according to claim 8, wherein
the medical device has a function of capturing an image of a subject, and
the controller restricts at least one of a time for displaying an image captured by the medical device, a display area for the image, and the quality of the image according to elapsed time in the operation check mode.

10. The medical device management system according to claim 1, wherein the controller:
detects the end of the operation check mode when the first duration is less than a predetermined time, and
detects the end of the operation check mode and the start of the use mode when the first duration is the predetermined time or more.

11. A medical device comprising:
a controller comprising hardware, the controller being configured to:
detect switching from an operation check mode for checking an operation of a medical device to a use mode for using the medical device;
record information indicating that the medical device has been used once when the switching from the operation check mode to the use mode is detected;
measure a time during which power is supplied to the medical device,
record a first duration measured from a start of the power supply to the medical device to an end of the power supply, and
detect the switching from the operation check mode to the use mode when a measured second duration becomes longer than the first duration;
wherein the controller is configured to restrict a function of the medical device based on the recorded information by one of:
stopping the power supply to the medical device;
blurring or partially hiding a captured image displayed on the device; or
displaying a message on the captured image that the endoscope cannot be used.

12. A relay device that connects a medical device and a control device, the relay device comprising:
a controller comprising hardware, the controller being configured to:
detect an end of an operation check mode for checking an operation of the medical device and detect a start of a use mode for using the medical device;
record information indicating that the medical device has been used once when the end of the operation check mode and the start of the use mode are detected;
measure a time during which power is supplied to the medical device,
record a first duration measured from a start of the power supply to the medical device to an end of the power supply, and
detect the end of the operation check mode and the start of the use mode when a measured second duration becomes longer than the first duration;
wherein the controller is configured to restrict a function of the medical device based on the recorded information by one of:
stopping the power supply to the medical device;
blurring or partially hiding a captured image displayed on the device; or
displaying a message on the captured image that the endoscope cannot be used.

13. A medical device management method comprising:
measuring a time during which power is supplied to a medical device,
recording a first duration from a start of the power supply to the medical device to an end of the power supply,
measuring a time during which the power is supplied to the medical device after the first duration is recorded,
detecting an end an operation check mode for checking an operation of the medical device and a start of a use mode for using the medical device when a second duration that has been measured becomes longer than the first duration, and
recording information indicating that the medical device has been used once after detecting the end of the operation check mode and the start of the use mode;
wherein based on the recorded information, restrict a function of the medical device to one of:
stop the power supply to the medical device;
blur or partially hide a captured image displayed on the device; or
display a message on the captured image that the endoscope cannot be used.

14. Non-transitory computer-readable storage storing instructions that cause a computer to at least perform:
measuring a time during which power is supplied to a medical device;
recording a first duration from a start of the power supply to the medical device to an end of the power supply;
measuring a time during which the power is supplied to the medical device after the first duration;
detecting an end an operation check mode for checking an operation of the medical device and a start of a use mode for using the medical device when a second duration that has been measured becomes longer than the first duration; and
recording information indicating that the medical device has been used once after detecting the end of the operation check mode and the start of the use mode;
wherein based on the recorded information, restrict a function of the medical device to one of:
stop the power supply to the medical device;
blur or partially hide a captured image displayed on the device; or
display a message on the captured image that the endoscope cannot be used.

* * * * *